US008231154B2

(12) United States Patent
Kovie

(10) Patent No.: US 8,231,154 B2
(45) **Date of Patent: *Jul. 31, 2012**

(54) CANCEL LEVER FOR CLAM SHELL VEHICLE DOORS

(75) Inventor: David Kovie, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/948,115

(22) Filed: Nov. 17, 2010

(65) Prior Publication Data

US 2011/0056138 A1 Mar. 10, 2011

Related U.S. Application Data

(63) Continuation of application No. 12/033,104, filed on Feb. 19, 2008, now Pat. No. 7,950,704.

(51) Int. Cl.
*E05B 3/00* (2006.01)
*B60J 10/08* (2006.01)

(52) U.S. Cl. ...... 292/336.3; 292/DIG. 21; 292/DIG. 65; 296/146.1; 296/146.9

(58) Field of Classification Search ................ 292/336.3
See application file for complete search history.

(56) References Cited

U.S. PATENT DOCUMENTS

| | | | | |
|---|---|---|---|---|
| 3,243,222 | A * | 3/1966 | Loughary et al. | 49/460 |
| 3,280,510 | A * | 10/1966 | Vaux | 49/401 |
| 5,803,516 | A * | 9/1998 | Hempel | 292/336.3 |
| 6,533,346 | B2 * | 3/2003 | Yu | 296/152 |
| 6,752,440 | B2 * | 6/2004 | Spurr | 292/336.3 |
| 7,182,392 | B2 * | 2/2007 | Sawajiri | 296/146.1 |
| 7,309,100 | B2 * | 12/2007 | Sawajiri | 296/146.1 |
| 7,950,704 | B2 * | 5/2011 | Kovie | 292/336.3 |

* cited by examiner

*Primary Examiner* — Carlos Lugo
(74) *Attorney, Agent, or Firm* — Young, Basile, Hanlon & MacFarlane, P.C.

(57) ABSTRACT

A door assembly for a vehicle body including a frame having a first boundary and a second boundary. A first door and a second door with first and second ends are pivotably coupled to the first boundary and the second boundary, respectively, of the frame. The second door includes an end panel at its second end, and a pivot is fixed to the end panel. A cancel lever is rotatably coupled to the pivot, and the cancel lever is arranged to be contacted by the first door at any location within a zone of contact determined by the relative positions of the first and second doors such that a force applied to the cancel lever by the first door includes a component perpendicular to a radius of the cancel lever at the point of contact.

22 Claims, 9 Drawing Sheets

SECT. A-A

SECT. A-A

SECT. A-A

CANCEL LEVER FOR CLAM SHELL VEHICLE DOORS

CROSS-REFERENCE TO RELATED APPLICATION

This application is a continuation application of pending application Ser. No. 12/033,104 filed Feb. 19, 2008, incorporated herein in its entirety.

TECHNICAL FIELD

The present invention pertains to the field of automotive door latches, and more particularly to clam shell style doors latches.

BACKGROUND

In vehicles with short cabs and multiple rows of seats, such as some extended cab pickup trucks, the cabs are often not long enough for two sets of traditional doors. Clam shell style doors are frequently used because they are capable of providing a door allowing ingress and egress to a back seat even when space is limited. Clam shell style doors include a traditionally hinged front door for ingress and egress to the front seats, as well as a coach door (hereinafter referred to as the access door) to provide ingress and egress to the back seats. Clam shell style doors are used in vehicle frames or openings without a pillar, so the latches for the traditionally hinged door are positioned on an end panel on the access door. As a result, the access door must be closed in order to properly close the front door. The access door can include a cancel lever that prevents operation of the door handle on the inside of the access door in order to prevent the access door from being opened while the front door is in a closed position, such as disclosed in U.S. Pat. No. 5,803,516, which is hereby incorporated by reference.

SUMMARY

In one disclosed embodiment, a door assembly is provided for a vehicle body. A frame on the vehicle body includes a first boundary and a second boundary opposite the first boundary that defines an opening with a first portion adjacent to the first boundary and a second portion adjacent to the second boundary. A first door has a first end and second end where the first end is pivotally coupled to the frame at the first boundary, with the second end being distal from the first end. The first door is pivotally fixed so that the door is movable between a closed position in which the first door conceals the first portion of the opening and an open position in which the first portion of the opening is exposed. A second door has a first end and a second end wherein the first end is pivotally coupled to the frame at the second boundary, with the second end being distal from the first end of the second door. The second door has a longitudinal surface at the second end and the second door is pivotally fixed so that it is movable between a closed position in which the second door conceals the second portion of the opening and an open position in which the second portion of the opening is exposed. The second end of the first door and the second end of second door are arranged to be adjacent and aligned with each other when the first and second doors are in the closed position. A door latch is on the second door to prevent the second door from moving from the closed position. A door latch release mechanism is on the second door configured to release the door latch to allow the second door to move from the closed position. A cancel lever has a contact surface extending from the longitudinal surface of the second door wherein the cancel lever has a range of motion relative to the longitudinal surface between a latch operation prevention position and a latch operation allowing position. The cancel lever is operably coupled to the door latch release mechanism to prevent operation of the latch release mechanism when the cancel lever is in latch operation prevention position. The first door is arranged to contact the contact surface of the cancel lever when the first door moves from the open position to the closed position. The cancel lever is arranged to move from the latch operation allowing position to the latch operation prevention position when the first door contacts the surface of the cancel lever.

In another embodiment, a door assembly is provided for a vehicle body. A frame on the vehicle body includes a first boundary and a second boundary opposite the first boundary that defines an opening with a first portion adjacent to the first boundary and a second portion adjacent to the second boundary. A first door has a first end and second end where the first end is pivotally coupled to the frame at the first boundary, with the second end being distal from the first end. The first door is pivotally fixed so that the door is movable between a closed position in which the first door conceals the first portion of the opening and an open position in which the first portion of the opening is exposed. A second door has a first end and a second end wherein the first end is pivotally coupled to the frame at the second boundary, with the second end being distal from the first end of the second door. The second door has a longitudinal surface at the second end and the second door is pivotally fixed so that it is movable between a closed position in which the second door conceals the second portion of the opening and an open position in which the second portion of the opening is exposed. The second end of the first door and the second end of second door are arranged to be adjacent and aligned with each other when the first and second doors are in the closed position. A door latch is on the second door to prevent the second door from moving from the closed position. A door latch release mechanism is on the second door configured to release the door latch to allow the second door to move from the closed position. A cancel lever has a pivot axis arranged to move the cancel lever about the pivot axis between a latch operation prevention position and a latch operation allowing position and a contact surface extending from the pivot axis. The cancel lever is operably coupled to the door latch release mechanism to prevent operation of the latch release mechanism when the cancel lever is in latch operation prevention position. The first door is arranged to contact the contact surface at a location along the contact surface that is closer to the second boundary of the frame than the pivot axis of the cancel lever when the first door moves from the open position to the closed position. The cancel lever is arranged to move from the latch operation allowing position to the latch operation prevention position when the first door contacts the surface of the cancel lever.

In an additional embodiment, a door assembly is provided for a vehicle body. A frame on the vehicle body includes a first boundary and a second boundary opposite the first boundary that defines an opening with a first portion adjacent to the first boundary and a second portion adjacent to the second boundary. A first door has a first end and second end where the first end is pivotally coupled to the frame at the first boundary, with the second end being distal from the first end. The first door is pivotally fixed so that the door is movable between a closed position in which the first door conceals the first portion of the opening and an open position in which the first portion of the opening is exposed. A second door has a first end and a second end wherein the first end is pivotally coupled to the frame at the second boundary, with the second end being distal from the first end of the second door. The second door has a longitudinal surface at the second end and the second door is pivotally fixed so that it is movable between a closed position in which the second door conceals the second portion of the opening and an open position in which the second portion of the opening is exposed. The second end of the first door and the second end of second door are arranged to be adjacent and aligned with each other when the first and second doors are in the closed position. A door latch is on the second door to prevent the second door from moving from the closed position. A door latch release mechanism is on the second door configured to release the door latch to allow the second door to move from the closed position. A cancel lever has a contact surface extending from the longitudinal surface of the second door wherein the cancel lever has a range of motion relative to the longitudinal surface between a latch operation prevention position and a latch operation allowing position. The cancel lever is operably coupled to the door latch release mechanism to prevent operation of the latch release mechanism when the cancel lever is in latch operation prevention position. The cancel lever has a contact surface arranged to extend substantially parallel to the longitudinal surface when the cancel lever is in the latch operation prevention position. The first door is arranged to contact the contact surface of the cancel lever when the first door moves from the open position to the closed position. The cancel lever is arranged to move from the latch operation allowing position to the latch operation prevention position when the first door contacts the surface of the cancel lever.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
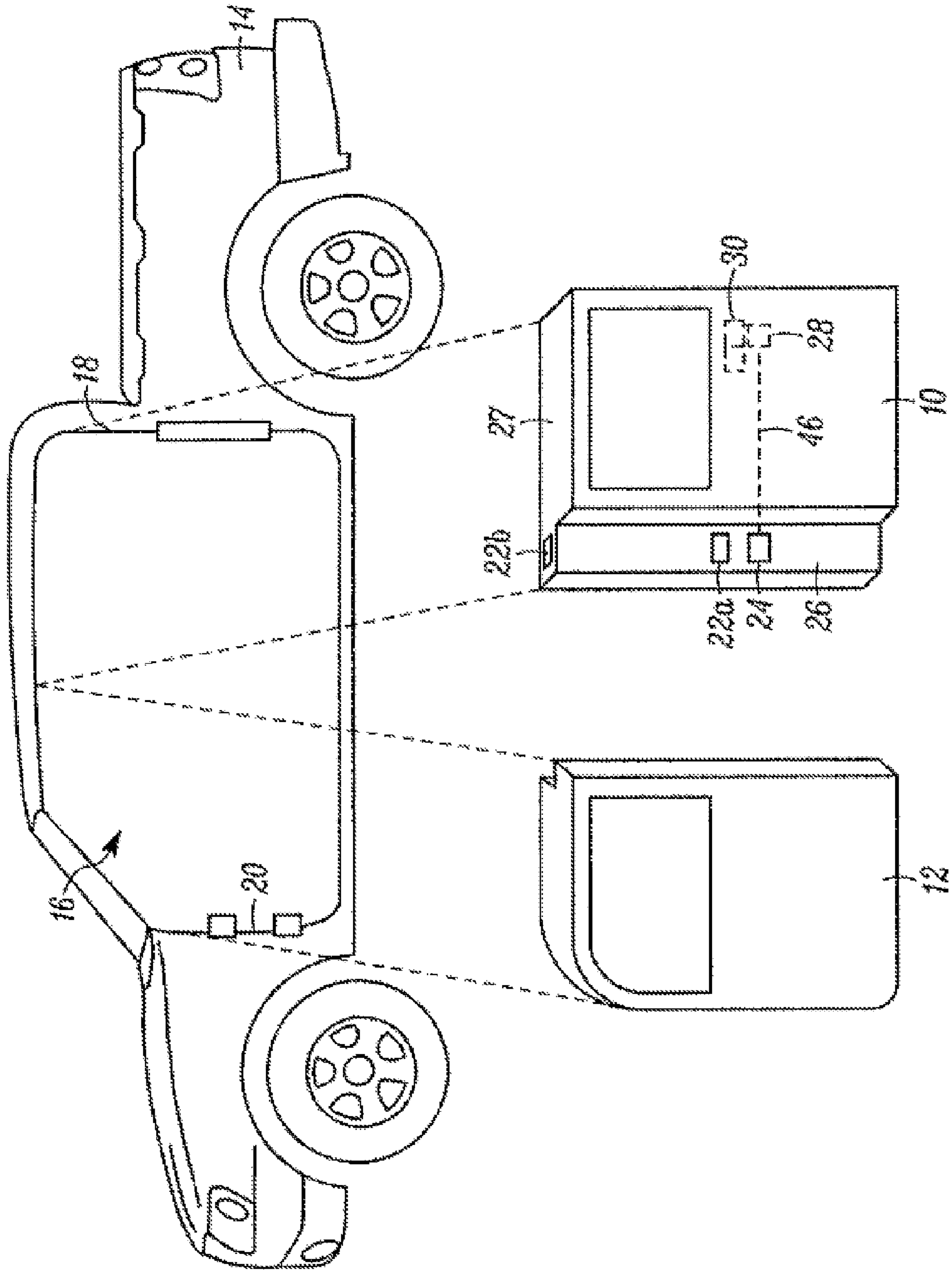
FIG. 1 is an exploded view of clam shell style doors in a vehicle portal with a phantom lines illustrating a mechanism for preventing operation of a door handle on the interior of an access door.

FIG. 1 illustrates clam shell style doors 10, 12 on a vehicle 14 having an opening or frame 16 with a first end or boundary 20 and a second end or boundary 18. A second door or access door 10 illustrated as a rear door is hinged to the second end or boundary 18 of the opening or frame 16, and a first door or traditionally hinged door 12 illustrated as a front door is hinged to the first end or boundary 20 of the opening or frame 16. Latches **22*a* for securing the first or traditionally hinged door 12 to the second or access door 10 can be positioned on an end panel 26 of the access door 10, while latches 22*b* for securing the access door 10 to the vehicle 14 can be on a top panel 27 and/or a bottom panel (not shown) of the second or access door 10. A cancel lever 24 can also be positioned on the end panel 26 of the second or access door 10. The cancel lever 24 is in communication with a mechanism 28 for preventing the operation of a door handle 30 on the interior of the access door 10 via a linkage 46**.

Figure 2:
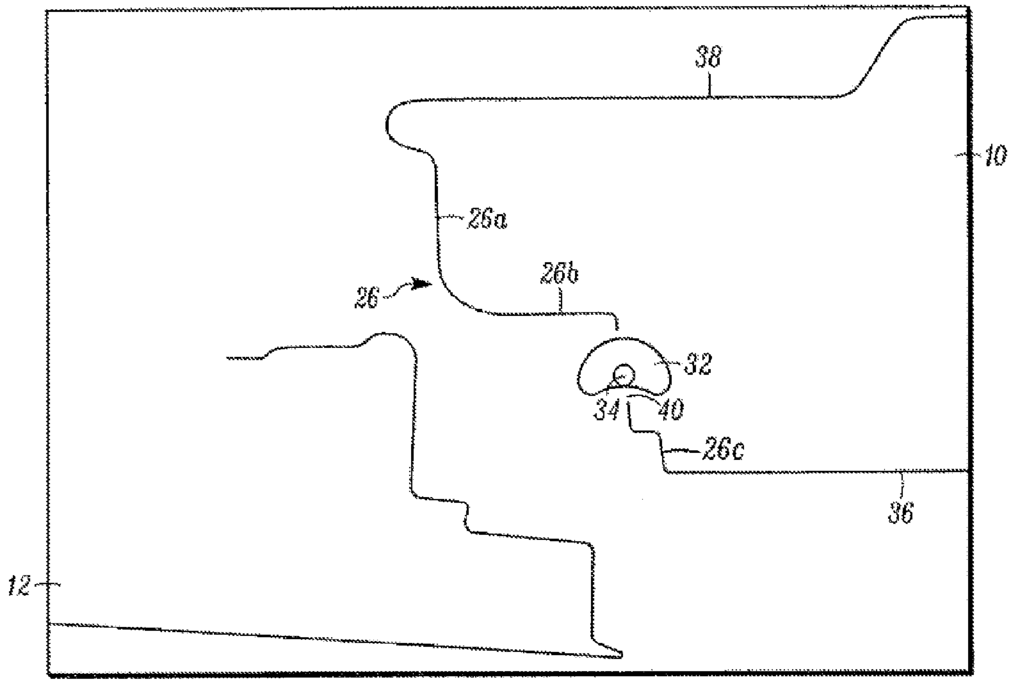
FIG. 2 BACKGROUND ART
FIG. 2 is a sectional view of a known cancel lever with an access door in a closed position and a traditionally hinged door in an open position.
Figure 3:
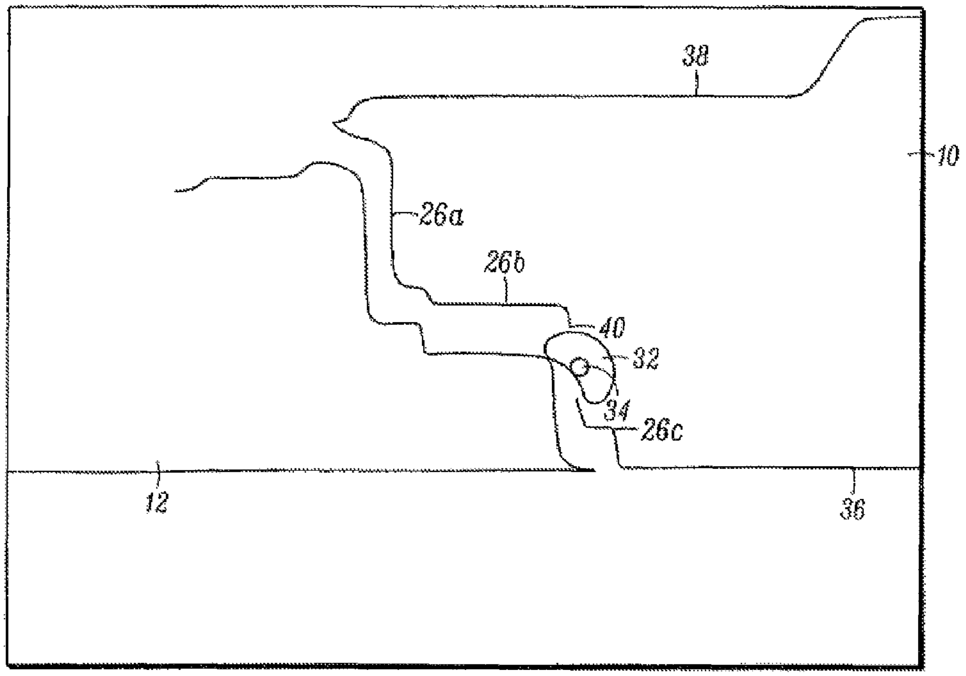
FIG. 3 BACKGROUND ART
FIG. 3 is a sectional view of the cancel lever of FIG. 2 with the access door in a closed position and the traditionally hinged door in a closed position.

FIG. 2 illustrates a conventional cancel lever 32 with the traditionally hinged door 12 in an open position, and FIG. 3 illustrates the conventional cancel lever 32 with the traditionally hinged door 12 in a closed position. The known cancel lever 32 is attached to a pivot 34 between a first door panel 36 and a second door panel 38, and projects through an aperture 40 defined by a laterally extending surface on a longitudinally facing portion **26*c* of the end panel 26. The lever 32 has a contact portion intended to be contacted by the traditionally hinged door 12 in order to pivot the lever 32 and actuate the mechanism 28 for preventing the operation the door handle 30 on the interior of the access door 10**.

Figure 4:
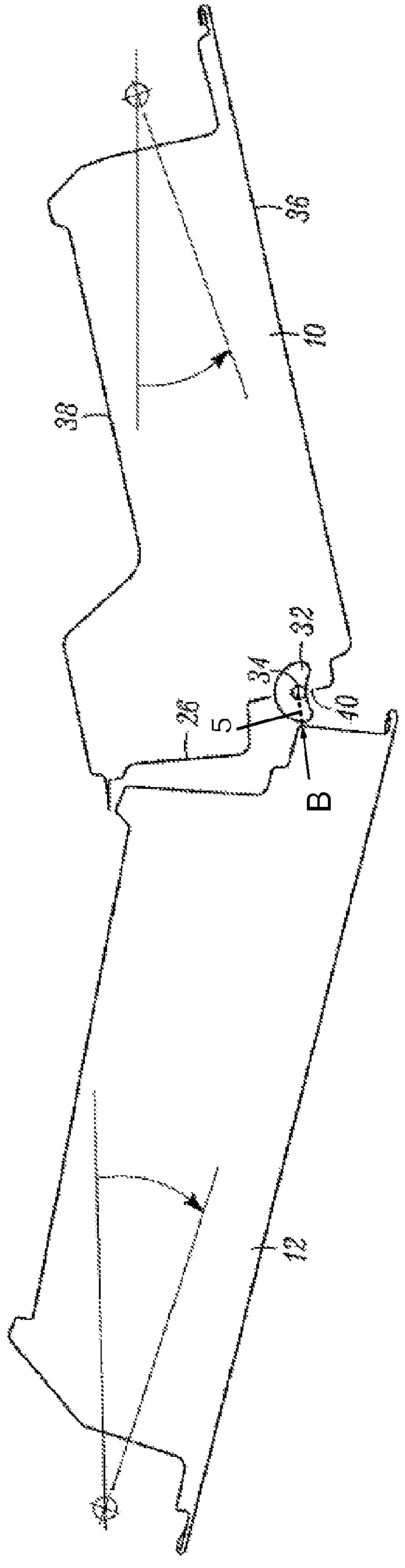
FIG. 4 BACKGROUND ART
FIG. 4 is a sectional view of the cancel lever of FIG. 2 with the access door in a partially open position and the traditionally hinged door jammed against the cancel lever.

However, occasionally the access door 10 is not in a completely closed position when the traditionally hinged door 12 is urged toward a closed position. As a result, the traditionally hinged door 12 can contact an unintended portion of the cancel lever 32, such as one of the round corners adjacent the contact portion intended to be contacted. FIG. 4 illustrates a jammed conventional cancel lever 32 due to the access door 10 being partially open when the traditionally hinged door 12 is urged toward a closed position. If the access door 10 is positioned such that the force applied by the traditionally hinged door 12 to the cancel lever 32 is substantially parallel to a radial vector of the cancel lever 32 extending between the pivot 34 and the point on the cancel lever 32 contacted by the traditionally hinged door 12, the cross product of the force vector and the radial vector equals zero, meaning the traditionally hinged door 12 does not apply torque to the cancel lever 32. As a result, conventional clam shell style doors 10, 12 are prone to jam the cancel lever 32 when the traditionally hinged door 12 is urged toward a closed position while the access door 10 remains partially open. Such jamming can also occur when the cross product is greater than zero, but too small to overcome friction and other forces that must be overcome for the cancel lever 24 to rotate.

Such jamming can rotate the cancel lever 32 to unintended positions relative to the aperture 40, causing the cancel lever 32 to become stuck in the aperture 40. The jamming can even break the cancel lever 32, or cause the doors 10, 12 to become stuck in partially closed position. The jamming can damage the traditionally hinged door 12. For example, the door 12 can be scratched by the cancel lever 32, making the door prone to rust, or the door 12 can be dented by the cancel lever 32 such that the door 12 no longer properly contacts the cancel lever 32.

Additionally, conventional cancel levers 32 have a small stroke due to spacing limitations as a result of the position of the cancel levers 32 along the laterally extending surfaces on longitudinal facing portions **26*a* and 26*c* of end panels 26. A consequence of the small stroke is that the traditionally hinged door 12 should be in a completely closed position in order for the cancel lever 32 to effectively prevent operation of the door handle 30. However, the latch 22***a* can be "half-latched", meaning the latch 22*a* is not fully engaged. Due to the small stroke of the cancel lever 32, a half-latched traditionally hinged door 12 may not actuate the cancel lever 32 to prevent operation of the door handle 30 on the interior of the access door 10. Additionally, when the traditionally hinged door 12 is half-latched, the driver may be under the impression that the traditionally hinged door 12 is fully closed and is actuating the cancel lever 32 because, for example, the dome light does not remain on and the dash does not indicate that a door is ajar. Even if the driver is alerted that the door 12 is not latched, the driver may not recognize that the cancel lever 32 is not actuated to prevent operation of the door handle 30. As a result, the door handle 30 may be actuated to unlatch the access door 10 from latches 22*b*. If this occurs, the traditionally hinged door 12 and the access door 10 are only prevented from opening by the half-latched latch 22*a*.

Moreover, the small stroke of the cancel lever 32 can prevent the cancel lever 32 from being actuated if build variations occur. Even a small variation in position of, for example, the placement of the cancel lever 32, the traditionally hinged door 12, or the access door 10 can prevent the cancel lever 32 from being actuated.

Figure 5:
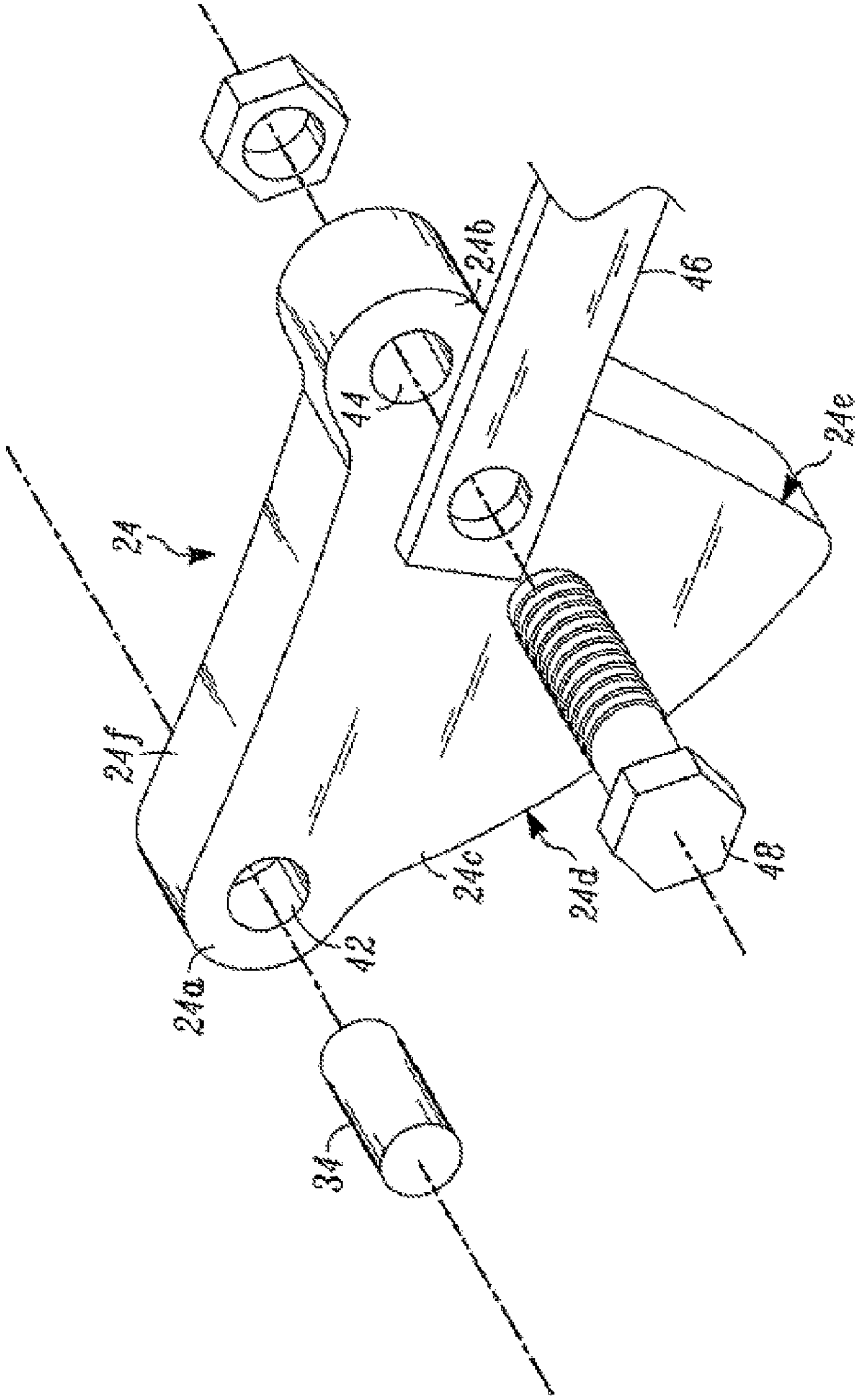
FIG. 5 is an exploded view of a cancel lever, a pivot, and a linkage.

FIG. 5 illustrates an embodiment of the cancel lever 24 arranged to be free from jamming and to avoid the problems associated with half-latching and build variations, along with the pivot 34 and the linkage 46. The cancel lever 24 can be relatively triangular shaped, with one portion 24*a* (hereinafter referred to as the "pivoting portion") configured to be coupled to the pivot 34, another portion 24*b* configured to be in communication with the mechanism 28 for preventing operation of the interior access door handle 30, and another portion 24*c* configured to be contacted by the traditionally hinged door 12. As illustrated, the pivoting portion 24*a* of the cancel lever 24 occupies one corner of the cancel lever 24 and includes an aperture 42 configured for insertion of the pivot 34. Alternatively, if the pivot 34 is in the form of a hinge, the pivoting portion 24*a* of the cancel lever 24 can include screw holes or otherwise be configured to be fixed to the hinge. The exact form of the pivoting portion 24*a* of the cancel lever 24 should correspond with the structure of the pivot 34. If desired, the pivoting portion 24*a* of the cancel lever 24 can include an edge configured to abut the end panel 26 when the cancel lever 24 is not contacted by the traditionally hinged door 12 in order to limit the amount of rotation of the cancel lever 24 outside of the end panel 26.

Also as illustrated, the portion 24*b* (hereinafter referred to as the "communicating portion") of the cancel lever 24 in communication with the mechanism 28 for preventing operation of the inside handle 30 of the access door 10 occupies a second corner of the relatively triangular shaped cancel lever 24. The communicating portion 24*b* of the cancel lever 24 can include a second aperture 44 configured to accept the end of the linkage 46, which communicates the rotation of the cancel lever 24 to the mechanism 28 for preventing operation of the handle 30 on the interior of the access door 10. The linkage 46 can be rotatably fixed to the cancel lever 24. For example, the linkage 46 can include a hook that is inserted through the aperture 44, or the cancel lever 24 can include a pivot that is attached to the linkage 46, such as the illustrated bolt 48. Alternatively, the coupling between the cancel lever 24 and the linkage 46 can take any other formed recognized as suitable by one of skill in the art having knowledge of the present application. For example, the rotation of the cancel lever 24 can generate an electronic signal, which is then relayed to a motor in order to actuate the mechanism 28 for preventing the operation of the door handle 30.

A third portion 24*c* of the cancel lever 24 is configured to be contacted by the traditionally hinged door 12 (hereinafter referred to as the "contact portion"). The contact portion 24*c* as illustrated occupies the majority of the cancel lever 24. The contact portion 24*c* can have two curved edges 24*d*, 24*e*. As illustrated, the first edge 24*d* has a convexly curved shape, though the shape of the first curved edge 24*d* can be based on the geometry of the doors 10, 12 and can therefore have a different shape than illustrated. Specifically, the edge 24*d* can be based on the position of the cancel lever 24 on the access door 10, the positions of the access door 10 that allow the cancel lever 24 to be contacted by the traditionally hinged door 12, and the geometry of the traditionally hinged door 12. With the cancel lever 24 properly curved, the traditionally hinged door 12 cannot apply force directly parallel to a radius 5 of the cancel lever 24 extending from the point on the cancel lever 24 that force is applied to the pivot 34. Depending on the geometry of the doors 10, 12 and the placement of the cancel lever 24, the edge 24*d* can be straight or have some other non-curved shape while still permitting the cancel lever 24 to function properly. The second curved edge 24*e* can be curved such that the cancel lever 24 does not contact the aperture 40 when the cancel lever 24 is pivoted into the aperture 40 by the traditionally hinged door 12. If the aperture 40 is sufficiently large, the aperture 40 need not be a consideration in determining the shape of the cancel lever 24.

As illustrated, the cancel lever 24 has a straight edge 24*f* connecting the pivoting portion 24*a* with the communicating portion 24*b*, and the communicating portion 24*b* is positioned longitudinally closer to the hinged end of the access door 10 than the pivoting portion 24*a*. However, the edge 24*f* need not be straight depending on the shape of the cancel lever 24; the shape of the edge 24*f* can vary depending on the shape of the cancel lever 24. While the cancel lever 24 is illustrated having a substantially triangular shape, it can also have a rectangular, oval, or other polygonal shape. For example, if the cancel lever 24 has a square shape, the edge 24*f* connecting the pivoting portion 24*a* with the communicated portion 24*b* includes a corner. Moreover, the placement of the various portions 24*a*, 24*b*, 24*c* and edges 24*d*, 24*e*, 24*f* can vary depending on the shape of the cancel lever 24.

Figure 6:
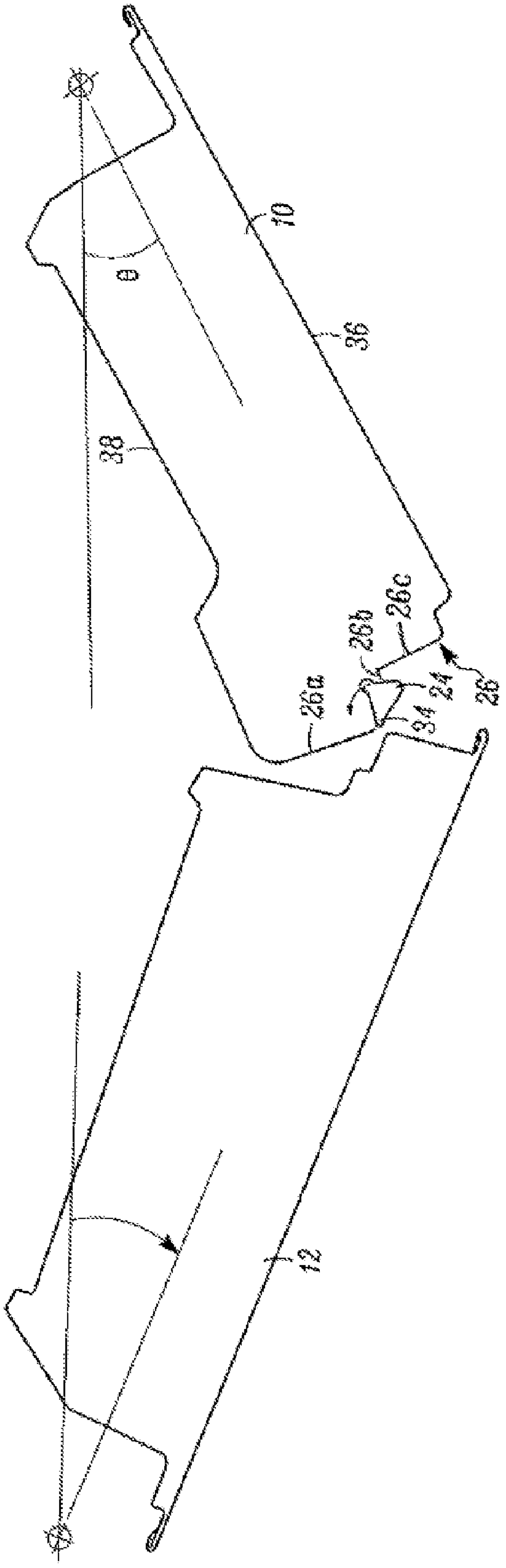
FIG. 6 is a sectional view illustrating the access door and a traditionally hinged door at relative locations placing a cancel lever slightly outside a zone of contact.

FIG. 6 illustrates the access door 10 and the traditionally hinged door 12 in positions such that the traditionally hinged door 12 will slightly miss contacting the cancel lever 24 if urged toward a closed position. In other words, FIG. 6 illustrates the access door 10 and the traditionally hinged door 12 at relative locations such that the cancel lever 24 is slightly outside of a zone of contact. If the access door 10 were positioned slightly more in a closed direction, i.e., if the access door 10 were positioned such that an angle θ between the position of the access door 10 as illustrated and a closed position is slightly smaller, then the cancel lever 24 would be placed in a zone of contact. With the cancel lever 24 in a zone of contact, the traditionally hinged door 12 can contact the cancel lever 24 when urged toward a closed position.

Figure 7:
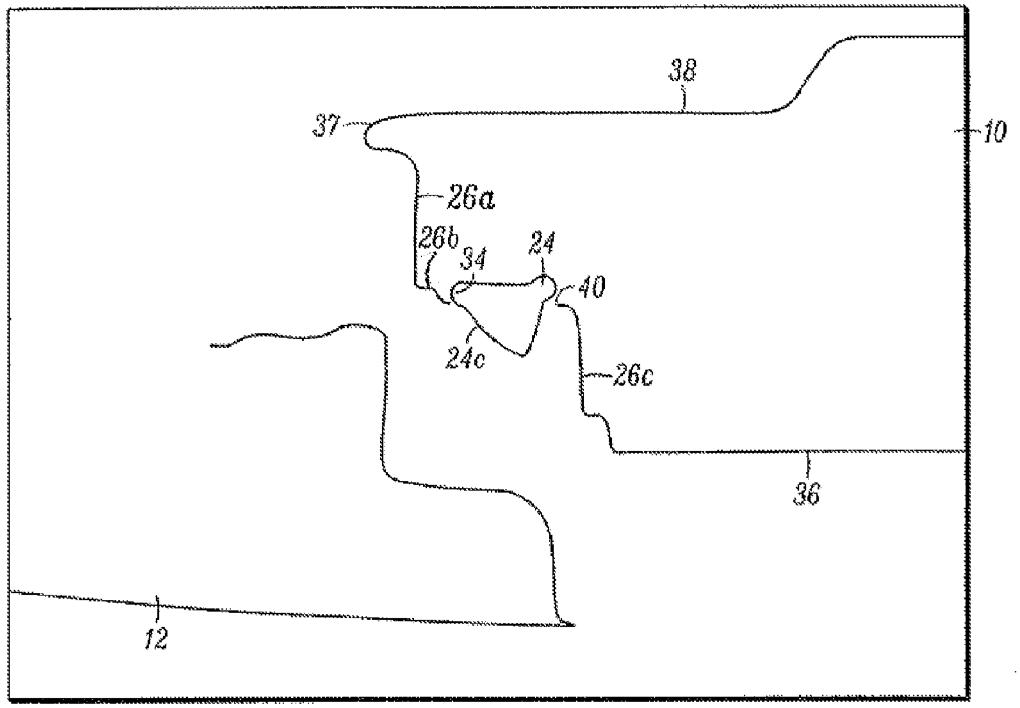
FIG. 7 is a sectional view of the cancel lever with the access door in a closed position and the traditionally hinged door in an open position.
Figure 8:
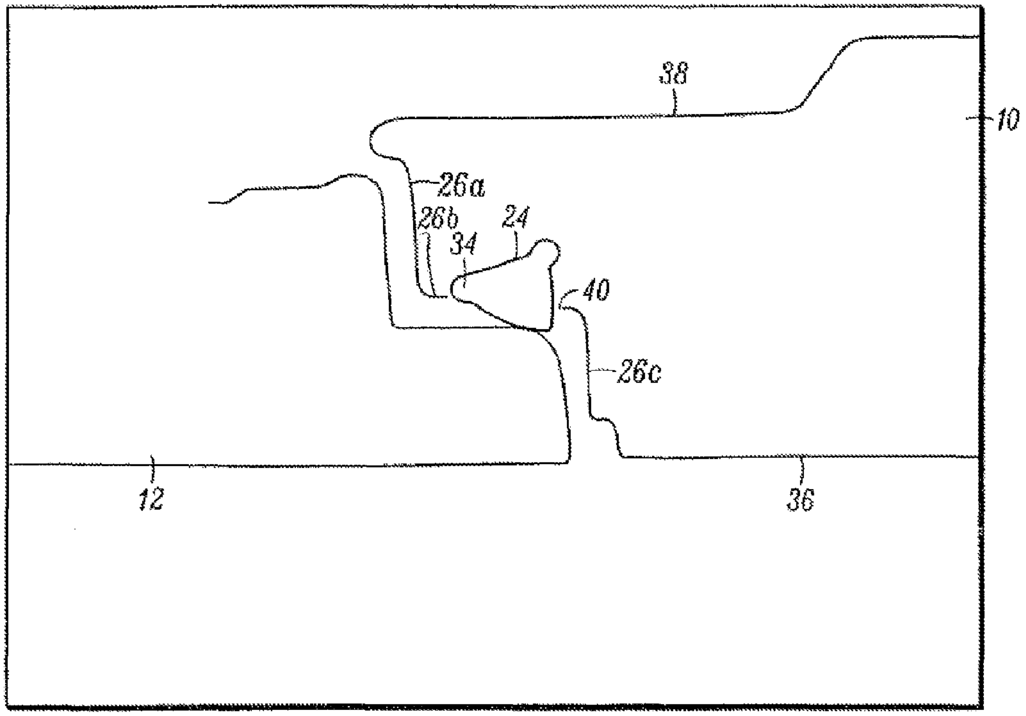
FIG. 8 is a sectional view of the cancel lever with the access door in a closed position and the traditionally hinged door in a closed position.

FIGS. 7 and 8 illustrate an embodiment of the cancel lever 24 of the present invention with the traditionally hinged door 12 in an open position and a closed position, respectively. The cancel lever 24 is installed on the access door 10 including a first door panel or outward facing surface 36, a second door panel or inward facing surface 38, and an end panel 26. The end panel 26 can be formed integrally with the first door panel 36 and/or the second door panel 38. The end panel 26 can include at least one of lateral surface 26*a* extending laterally from the inward facing surface 38 and lateral surface 26*c* extending laterally from the outward facing surface 36 and at least one longitudinal surface 26*b* longitudinally extending between the first lateral surface 26*a* and the second lateral surface 26*c*. The directions of each surface are determined with respect to the conventional lateral and longitudinal orientations of vehicle 14.

The pivot 34 is positioned adjacent to the end panel 26. As illustrated, the pivot 34 is on the interior of the end panel 26. However, the pivot 34 can alternatively be located in line with the end panel 26 or on the exterior of the end panel 26. The pivot 34 should be protected from or strong enough to withstand contact from the traditionally hinged door 12. The pivot 34 can be a rod supported by bushings or bearings, a hinge, or any other pivotable element recognized as suitable by one of skill in the art having knowledge of the present application.

Longitudinal surface 26*b* of the end panel 26 includes a longitudinally extending surface defining the aperture 40. As illustrated, the cancel lever 24 projects from the interior of the end panel 26, through the aperture 40, and past the longitudinally extending surface of the end panel 26 when not contacted by the traditionally hinged door 12. The aperture 40 can be located adjacent the pivot 34 in a direction toward the hinged end of the access door 10. The size of the aperture 40 can be such that the aperture 40 permits a portion of the cancel lever 24 to project to outside of the end panel 26, but small enough such that the cancel lever 24 can abut the end panel 26 to prevent further rotation of the lever 24. The aperture 40 need not be small enough to prevent rotation of the cancel lever 24 to the exterior of the end panel 26 if some other structure adequately does so. Alternatively, if the pivot 34 is located on the exterior of the end panel 26, the aperture 40 provides an opening through which the cancel lever 24 can rotate when contacted by the traditionally hinged door 12. The aperture 40 can be configured differently from the slot as illustrated. For example, the aperture 40 can be a recess in the end panel 26 or take another form recognized as suitable by one of skill in the art having knowledge of the present application for permitting the cancel lever 24 to be contacted by the traditionally hinged door 12 and rotated in response to the contact.

Figure 9:
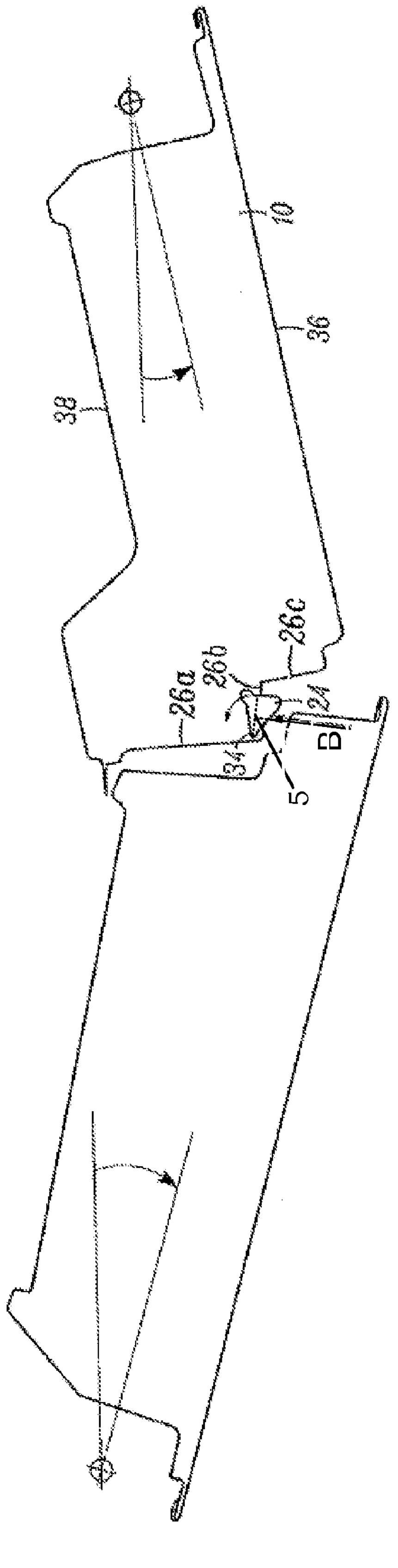
FIG. 9 is a sectional view of the cancel lever with the doors in the same position as illustrated in FIG. 4.

FIGS. 7-9 additionally illustrated the access door 10 as including a flange 37 for creating a seal between doors 10 and 12, aiding in the alignment of the doors 10, 12. The flange 37 can also have the effect of altering the positions of the access door 10 that place the cancel lever 24 in the zone of contact, thereby preventing the cancel lever 24 from contacting an unintended portion of the traditionally hinged door 12. However, as illustrated in FIG. 6, such a flange 37 need not be included.

The cancel lever 24 can be installed by attaching the cancel lever 24 to the pivot 34 and the linkage 46. As illustrated in FIG. 7, the contact portion 24*c* of the cancel lever 24 projects through the aperture 40 on longitudinally extending surface 26*b* of the end panel 26 when not contacted by the traditionally hinged or first door 12. Also in this embodiment, the contact portion 24*c* of the cancel lever 24 is positioned closer to the hinged end of the access door 10 than the pivot 34. When the traditionally hinged door 12 is urged toward a closed position, as illustrated in FIG. 8, the cancel lever 24 is rotated in the same direction as the traditionally hinged door 12. As a result, the cancel lever 24 actuates the mechanism 28 for preventing the operation of the handle 30 on the interior of the access door 10 by biasing the linkage 46. When the traditionally hinged door 12 is moved to an open position, the cancel lever 24 is biased back to the position as illustrated in FIG. 7.

The cancel lever 24 eliminates the jamming problem associated with known cancel levers 32. Jamming occurs when the force B applied to a point on the cancel lever 24 is parallel to the radius 5 of the point on the cancel lever 24 extending through the pivot 34. In this case, the cross product of the force vector B and the radial vector equals zero, meaning the traditionally hinged door 12 does not apply torque to the cancel lever 24. Jamming can also occur when the cross product is greater than zero, but too small to overcome friction and other forces that must be overcome for the cancel lever 24 to rotate. However, as illustrated in FIG. 9, even if the access door 10 is in a partially open position, the traditionally hinged door 12 always strikes the cancel lever 24 at a position that causes the cancel lever 24 to rotate. The cancel lever 24 is arranged such that the traditionally hinged 12 door cannot apply force B parallel to a radius 5 of the cancel lever 24, so the traditionally hinged door 12 must apply torque to the cancel lever 24.

Additionally, the cancel lever 24 can have a longer stroke than a conventional cancel lever 32 because the placement of the cancel lever 24 on a longitudinally extending surface 26*b* of the end panel 26 permits more room for rotation of the cancel lever 24. Even if the traditionally hinged door 12 is half-latched, the cancel lever 24 can be rotated a sufficient amount to actuate the linkage 46 to prevent operation of the door handle 30. The longer stroke also permits the cancel lever 24 to function despite build variations.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A door assembly for a vehicle body comprising:

a frame having a first boundary and a second boundary opposite the first boundary that define an opening with a first portion adjacent to the first boundary and a second portion adjacent to the second boundary;

a first door comprising a first end and a second end wherein the first end is pivotally coupled to the frame at the first boundary, the second end being distal from the first end of the first door, wherein the first door is rotatably movable between a closed position in which the first door conceals the first portion of the opening and an open position in which the first portion of the opening is exposed;

a second door comprising a first end and a second end wherein the first end is pivotally coupled to the frame at the second boundary, the second end being distal from the first end of the second door, wherein the second door is rotatably movable between a closed position in which the second door conceals the second portion of the opening and an open position in which the second portion of the opening is exposed, and wherein the second end of the first door is adjacent to and aligned with the second end of the second door when the first door and the second door are in the closed positions, and wherein the second door has an outward facing surface and an inward facing surface and the second end has an end panel extending between the outward facing surface and the inward facing surface, the end panel having a portion extending in a same direction as the outward facing surface and the inward facing surface;

a door latch on the second door configured to prevent the second door from moving from the closed position;

a door latch release mechanism configured to release the door latch to allow the second door to move from the closed position; and a cancel lever comprising a contact surface extending from the portion of the end panel wherein the cancel lever has a range of motion relative to the portion of the end panel between a latch operation prevention position and a latch operation allowing position, the cancel lever operably coupled to the door latch release mechanism to prevent operation of the door latch release mechanism when the cancel lever is in the latch operation prevention position, wherein the first door is arranged to contact the contact surface of the cancel lever when the first door moves from the open position to the closed position and the cancel lever is arranged to move from the latch operation allowing position to the latch operation prevention position when the first door contacts the contact surface of the cancel lever.

2. The door assembly of claim 1, wherein the portion of the end panel faces outward from the opening and defines a part of an aperture through which at least some of the cancel lever extends.

3. The door assembly of claim 2, wherein the cancel lever has a pivot axis located adjacent to the aperture wherein the pivot axis is located inboard of the portion of the end panel and the contact surface extends outboard through the aperture.

4. The door assembly of claim 2, wherein the portion of the end panel is located between the inward facing surface and the outward facing surface.

5. The door assembly of claim 4, wherein the portion of the end panel is a first portion and the end panel further includes a second portion extending in a perpendicular direction from the inward facing surface at the second end of the second door and a third portion extending in the perpendicular direction from the outward facing surface at the second end of the second door, wherein the first portion extends between the second portion and the third portion.

6. The door assembly of claim 1, wherein the first door is a front vehicle door for accessing a front seat of the vehicle, and the second door is a rear vehicle door for accessing a rear seat of the vehicle.

7. The door assembly of claim 1, wherein a link mechanically couples the cancel lever to the door latch release mechanism.

8. The door assembly of claim 1, wherein the entire contact surface of the cancel lever remains exterior from the pivot axis in a direction interior the vehicle to exterior the vehicle as it moves between the latch operation prevention position and the latch operation allowing position.

9. The door assembly of claim 1, wherein the contact surface is substantially parallel to the portion of the end panel when the cancel lever is in the latch operation prevention position.

10. The door assembly of claim 3, wherein the pivot axis of the cancel lever is in a plane that is adjacent to and parallel to the portion of the end panel.

11. A door assembly for a vehicle body comprising:

a frame comprising a first boundary and a second boundary opposite the first boundary defining an opening having a first portion adjacent to the first boundary and a second portion adjacent to the second boundary;

a first door having a first end and a second end wherein the first end is pivotally coupled to the frame at the first boundary so that the first door is rotatably movable between a closed position in which the first door conceals the first portion of the opening and an open position in which the first portion of the opening is exposed;

a second door having a first end and a second end wherein the first end is pivotally coupled to the frame at the second boundary so that the second door is rotatably movable between a closed position in which the second door conceals the second portion of the opening and an open position in which the second portion of the opening is exposed, wherein the second door has an end panel at the second end including a portion extending in a same direction as an exterior surface and an interior surface of the second door, and wherein the second end of the first door is arranged to be adjacent to and aligned with the second end of the second door when the first door and the second door are in the closed position;

a door latch on the second door configured to prevent the second door from moving from the closed position;

a door latch release mechanism configured to release the door latch to allow the second door to move from the closed position; and a cancel lever extending from the portion of the end panel and comprising a pivot axis about which the cancel lever moves between a latch operation prevention position and a latch operation allowing position, the cancel lever having a contact surface extending from the pivot axis, wherein the cancel lever is operably coupled to the door latch release mechanism to prevent operation of the latch release mechanism when the cancel lever is in the latch operation prevention position, the first door arranged to contact the contact surface at a location along the contact surface that is closer to the second boundary of the frame than the pivot axis of the cancel lever when the first door moves from the open position to the closed position, and wherein the cancel lever is arranged to move from the latch operation allowing position to the latch operation prevention position when the first door contacts the contact surface of the cancel lever.

12. The door assembly of claim 11, wherein the cancel lever is substantially triangular shaped having a first apex, a second apex and a third apex, with the first apex closer in proximity to the pivot axis of the cancel lever than the second apex or the third apex.

13. The door assembly of claim 12, wherein the contact surface of the cancel lever extends between the first apex and the second apex, with the first apex and pivot axis being located inboard of the portion of the end panel, and the third apex of the cancel lever operably coupled to the latch release mechanism.

14. The door assembly of claim 11, wherein the cancel lever is arranged to move from the latch operation allowing position to the latch operation prevention position about the pivot axis in a first direction and the first door is arranged to move about the first boundary of the frame from the open position to the closed position in the first direction.

15. The door assembly of claim 11, wherein a force applied to the cancel lever by the first door is non-parallel to a radius of the cancel lever.

16. The door assembly of claim 11, wherein the first door only contacts the contact surface at a location that is closer to the second boundary of the frame than the pivot axis of the cancel lever.

17. The door assembly of claim 11, wherein the entire contact surface of the cancel lever remains outward from the pivot axis in a direction from an interior of the vehicle to exterior the vehicle as it moves between the latch operation prevention position and the latch operation allowing position.

18. A door assembly for a vehicle body comprising:

a frame comprising a first boundary and a second boundary opposite the first boundary, the frame defining an opening with a first portion adjacent to the first boundary and a second portion adjacent to the second boundary;

a first door having a first end and a second end wherein the first end is pivotally coupled to the frame at the first boundary so that the door is rotatably movable between a closed position in which the first door conceals the first portion of the opening and an open position in which the first portion of the opening is exposed;

a second door comprising a first end and a second end wherein the first end is pivotally coupled to the frame at the second boundary so that the second door is rotatably movable between a closed position in which the second door conceals the second portion of the opening and an open position in which the second portion of the opening is exposed, the second door having an end panel at the second end, the second end of the first door arranged to be adjacent to and aligned with the second end of second door when the first and second doors are in the closed position, wherein the end panel is non-linear and includes a portion extending in a same direction as an exterior surface and an interior surface of the second door;

a door latch on the second door to prevent the second door from moving from the closed position;

a door latch release mechanism configured to release the door latch to allow the second door to move from the closed position; and a cancel lever extending from the portion of the end panel with a range of motion relative to the portion of the end panel between a latch operation prevention position and a latch operation allowing position, the cancel lever operably coupled to the door latch release mechanism and configured to prevent operation of the latch release mechanism when the cancel lever is in latch operation prevention position, the cancel lever having a contact surface arranged to extend substantially parallel to the portion of the end panel when the cancel lever is in the latch operation prevention position, wherein the first door is arranged to contact the contact surface of the cancel lever when the first door moves from the open position to the closed position, and the cancel lever is arranged to move from the latch operation allowing position to the latch operation prevention position when the first door contacts the surface of the cancel lever.

19. The door assembly of claim 18, wherein the cancel lever is substantially triangular shaped having a first apex, a second apex and a third apex, with a pivot axis proximate the first apex, wherein the contact surface of the cancel lever extends between the first apex and the second apex.

20. The door assembly of claim 19, wherein the first apex and the pivot axis are located inboard of the portion of the end panel, and the third apex of the cancel lever is operably coupled to the latch release mechanism.

21. The door assembly of claim 19, wherein the pivot axis is in a plane that is adjacent and parallel to the portion of the end panel.

22. The door assembly of claim 19, wherein the cancel lever is arranged to move from the latch operation allowing position to the latch operation prevention position about the pivot axis in a first direction and the first door is arranged to move about the first boundary of the frame from the open position to the closed position in the first direction.

* * * * *